US007840339B2

(12) United States Patent
Kim et al.

(10) Patent No.: US 7,840,339 B2
(45) Date of Patent: Nov. 23, 2010

(54) TRAFFIC INFORMATION DISPLAY METHOD AND APPARATUS

(75) Inventors: Jong Hyun Kim, Suwon-si (KR); Jin Won Kim, Seoul (KR); Kwang Soo Kim, Seoul (KR); Hyun Suk Min, Suwon-si (KR); Suk In Jung, Seoul (KR); Hye Jung Yang, Busan (KR); Sung Chul Yang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1034 days.

(21) Appl. No.: 11/604,068

(22) Filed: Nov. 24, 2006

(65) Prior Publication Data

US 2007/0157120 A1 Jul. 5, 2007

(30) Foreign Application Priority Data

Jan. 2, 2006 (KR) ..................... 10-2006-0000202

(51) Int. Cl.
*G08G 1/052* (2006.01)
*G06F 3/048* (2006.01)

(52) U.S. Cl. ....................... 701/119; 701/118; 701/210; 701/213; 340/905; 340/995.13; 370/252

(58) Field of Classification Search .................. 701/119
See application file for complete search history.

(56) References Cited

U.S. PATENT DOCUMENTS

| | | | | |
|---|---|---|---|---|
| 5,982,298 | A * | 11/1999 | Lappenbusch et al. | 340/905 |
| 6,594,576 | B2 * | 7/2003 | Fan et al. | 701/117 |
| 7,440,842 | B1 * | 10/2008 | Vorona | 701/117 |
| 7,511,634 | B2 * | 3/2009 | Stehle et al. | 340/905 |
| 2004/0204845 | A1 * | 10/2004 | Wong | 701/210 |
| 2004/0249568 | A1 * | 12/2004 | Endo et al. | 701/209 |
| 2005/0187708 | A1 * | 8/2005 | Joe et al. | 701/210 |
| 2006/0055565 | A1 * | 3/2006 | Kawamata et al. | 340/995.13 |
| 2006/0122846 | A1 * | 6/2006 | Burr et al. | 705/1 |
| 2006/0241987 | A1 * | 10/2006 | Pallotto et al. | 705/7 |
| 2006/0268736 | A1 * | 11/2006 | Lee et al. | 370/252 |
| 2006/0268737 | A1 * | 11/2006 | Lee et al. | 370/252 |
| 2007/0010941 | A1 * | 1/2007 | Marsh | 701/209 |
| 2007/0019562 | A1 * | 1/2007 | Kim et al. | 370/252 |
| 2007/0076759 | A1 * | 4/2007 | Kim et al. | 370/476 |

FOREIGN PATENT DOCUMENTS

| | | |
|---|---|---|
| KR | 1020030019538 | 3/2003 |
| KR | 1020050072555 | 7/2005 |
| KR | 1020060007580 | 1/2006 |
| WO | WO 99/14701 | 3/1999 |

OTHER PUBLICATIONS

Sammo Cho et al., "An Efficient Transmission of Traffic and Traveler Information Using Digital Multimedia Broadcasting Network", Vehicular Technology Conference, vol. 4, Sep. 25, 2005.

* cited by examiner

*Primary Examiner*—Thomas G Black
*Assistant Examiner*—Lin B Olsen
(74) *Attorney, Agent, or Firm*—The Farrell Law Firm, LLP

(57) ABSTRACT

A traffic information display method includes creating a highest-level traffic information selection menu among traffic information categorized in multiple levels, and displaying the created traffic information selection menu, creating a low-level menu including associated travel speed data, and displaying the created low-level traffic information selection menu and repeating the creation of the low-level menu until the lowest-level menu is displayed.

15 Claims, 6 Drawing Sheets

(a) (b) (c) (d)

FIG. 3

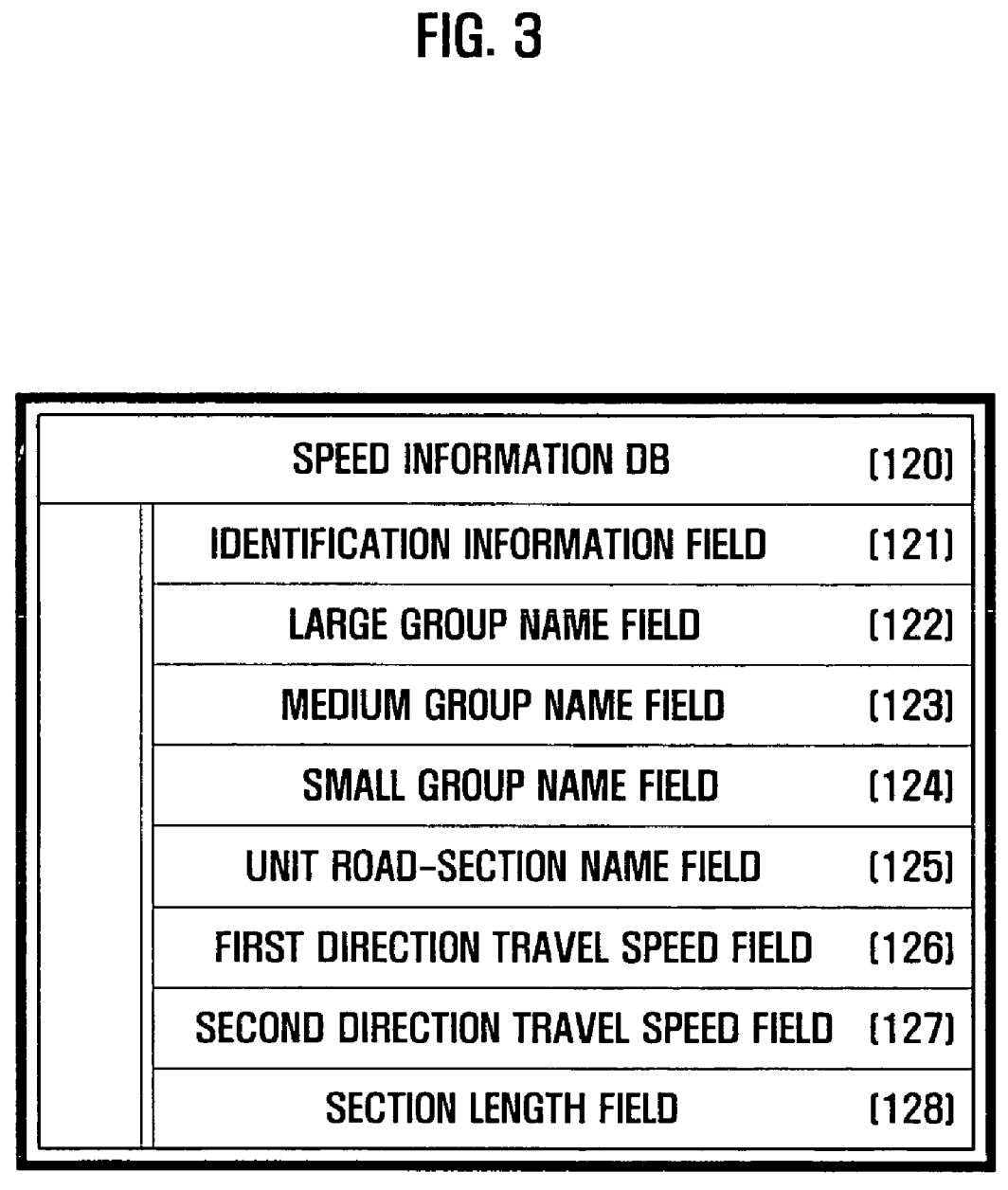

| | |
|---|---|
| SPEED INFORMATION DB | [120] |
| IDENTIFICATION INFORMATION FIELD | [121] |
| LARGE GROUP NAME FIELD | [122] |
| MEDIUM GROUP NAME FIELD | [123] |
| SMALL GROUP NAME FIELD | [124] |
| UNIT ROAD-SECTION NAME FIELD | [125] |
| FIRST DIRECTION TRAVEL SPEED FIELD | [126] |
| SECOND DIRECTION TRAVEL SPEED FIELD | [127] |
| SECTION LENGTH FIELD | [128] |

TRAFFIC INFORMATION DISPLAY METHOD AND APPARATUS

PRIORITY

This application claims priority under 35 U.S.C. §119 from Korean Patent Application No. 2006-0000202, which was filed in the Korean Intellectual Property Office on Jan. 2, 2006, the contents of which are incorporated herein by reference.

BACKGROUND OF THE INVENTION

1. Field of the Invention

The present invention relates generally to a traffic information display method and apparatus and, more particularly, to a traffic information display method and apparatus wherein traffic information is displayed at user selectable levels.

2. Description of the Related Art

In recent years, a steady growth of automobiles being driven on highways has caused serious traffic congestion and an increase in traffic accidents. As a result, there have been various schemes developed to provide drivers with real time traffic information regarding road traffic conditions, accidents and the like.

In providing real time traffic information, the traffic information may be announced by traffic reporters during delivery of FM broadcasting services, transmitted through some parts of FM data channels for FM broadcasting services, provided as a type of added service of mobile communication companies, and provided using a digital multimedia broadcasting (DMB) service.

In the DMB service, real-time traffic information is provided as Transport Protocol Experts Group (TPEG) data coded in a format defined by TPEG protocols, which are new standards for delivering traffic and travel information. That is, TPEG data containing real-time traffic information is inserted into a data area of DMB data, and the DMB data is broadcast. Hence, the real-time traffic information can be provided to many unspecified DMB users.

FIG. 1 illustrates a conventional procedure to display traffic information using a mobile communication terminal. Traffic information is displayed in order from FIG. 1*a* to FIG. 1*d*. The user must pass through multiple levels to determine the travel speed at a desired section of a road. For example, to determine the travel speed on unit road-sections between ABC Interchange and XYZ Tollgate along the QRS Expressway, the user must pass through multiple levels as shown in FIGS. 1*a* to 1*d*. This occurs because, in such a conventional traffic information display method, travel speed information is displayed only at the lowest level corresponding to unit road-sections. Hence, the user must move down to the lowest level corresponding to unit road-sections of the desired road, thereby causing user inconvenience.

SUMMARY OF THE INVENTION

The present invention has been developed in view of the above problems, and an object of the present invention is to provide a traffic information display method and apparatus wherein traffic information is presented to the user in a convenient manner.

Another object of the present invention is to provide a traffic information display method and apparatus wherein traffic information can be presented at higher levels than unit road-sections, the unit road-sections being minimum units of traffic information display.

Another object of the present invention is to provide a traffic information display method and apparatus wherein traffic information can be displayed at user selectable levels.

In accordance with the present invention, there is provided a traffic information display method including creating, in response to a traffic information display request from a user, the highest-level traffic information selection menu among traffic information categorized in multiple levels, and displaying the created traffic information selection menu; creating, in response to a selection of information of a user, a low-level traffic information selection menu including associated travel speed data, and displaying the created low-level traffic information selection menu; and repeating the step of creating a low-level menu until the lowest-level menu is displayed.

Preferably, the step of creating a low-level menu includes finding records storing selected current-level traffic information, sorting the records having the same field values storing traffic information that is lower in level than the selected current-level traffic information into the same low-level traffic information group, deriving travel speed data for all of the low-level traffic information using travel speed data on a unit road-section corresponding to records that are sorted as the same low-level traffic information group, and displaying the low-level traffic information and associated travel speed data list.

In accordance with the present invention, there is provided a traffic information display apparatus including a display; a receiver for receiving Transport Protocol Experts Group (TPEG) data containing real-time traffic information; a speed information database for managing travel speed data of unit road-sections, the unit road-sections being minimum units for traffic information display; a traffic information selection menu generator for creating low-level traffic information selection menus including associated travel speed data derived using the speed information database; and a controller for controlling, in response to a traffic information display request from a user, the traffic information selection menu generator to create a low-level traffic information selection menu containing associated travel speed data for selecting traffic information that is lower in level than current-level traffic information being displayed.

Preferably, the speed information database includes a large group name field storing information on a large group including the highest-level traffic information among traffic information categorized in multiple levels; a medium group name field storing one of a plurality of medium group names contained in the large group stored in the large group name field; a small group name field storing one of a plurality of small group names contained in the medium group stored in the medium group name field; a unit road-section name storing one of a plurality of unit road-section names contained in the small group stored in the small group name field; a travel speed field storing real-time travel speed data of the unit road-section stored in the unit road-section field; and a section length field storing the length of the unit road-section.

The traffic information selection menu generator finds records storing selected current-level traffic information, sorts the records having the same field values and storing traffic information that is lower in level than the selected current-level traffic information, into the same low-level traffic information group, deriving travel speed data for each low-level traffic information using travel speed data on a unit road-section corresponding to records that are sorted as the same low-level traffic information group, and displays the low-level traffic information and associated travel speed data list.

The traffic information display apparatus may be a mobile communication terminal.

BRIEF DESCRIPTION OF THE DRAWINGS

The above and other objects, features and other advantages of the present invention will be more clearly understood from the following detailed description taken in conjunction with the accompanying drawings, in which:

FIG. 3 shows the record structure of a database maintaining road-section travel speed data in the mobile communication terminal of FIG. 2;

DETAILED DESCRIPTION OF THE PREFERRED EMBODIMENTS

Figure 1:
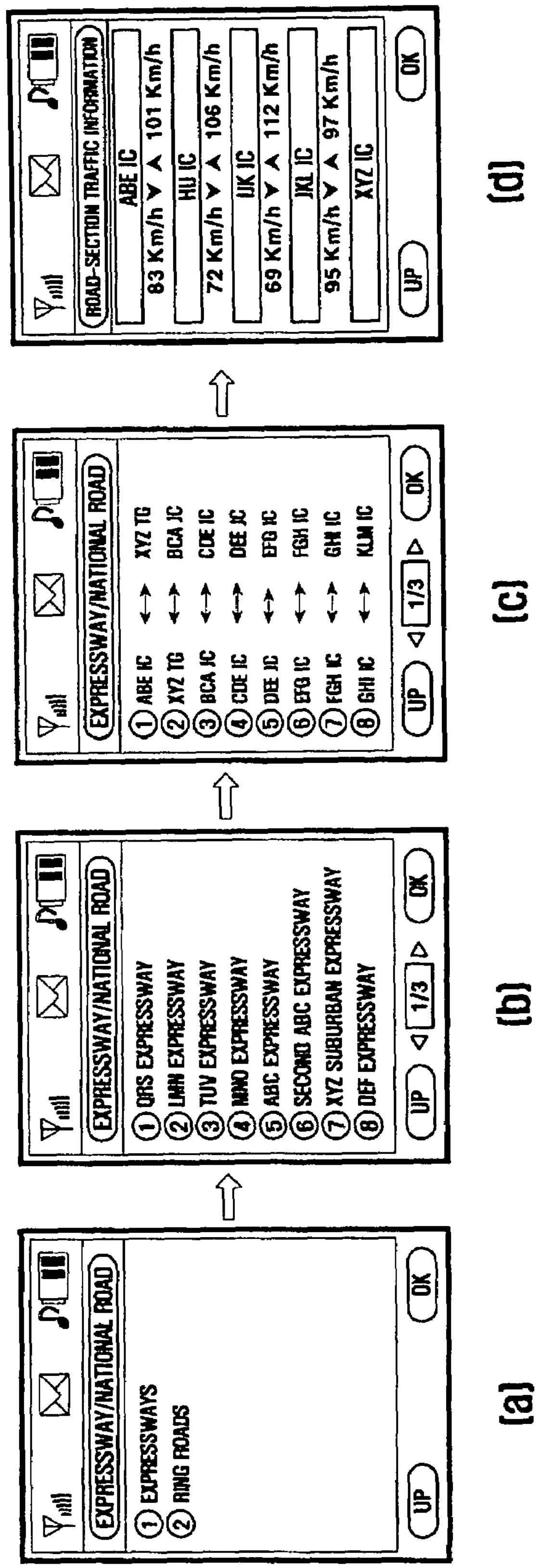
FIG. 1 (PRIOR ART)
FIG. 1 is a series of display screens illustrating a conventional traffic information display procedure using a mobile communication terminal.

Hereinafter, preferred embodiments of the present invention are described in detail with reference to the accompanying drawings. The same reference symbols identify the same or corresponding elements in the drawings. Some constructions or processes known in the art are not described for the sake of clarity and conciseness.

Figure 2:
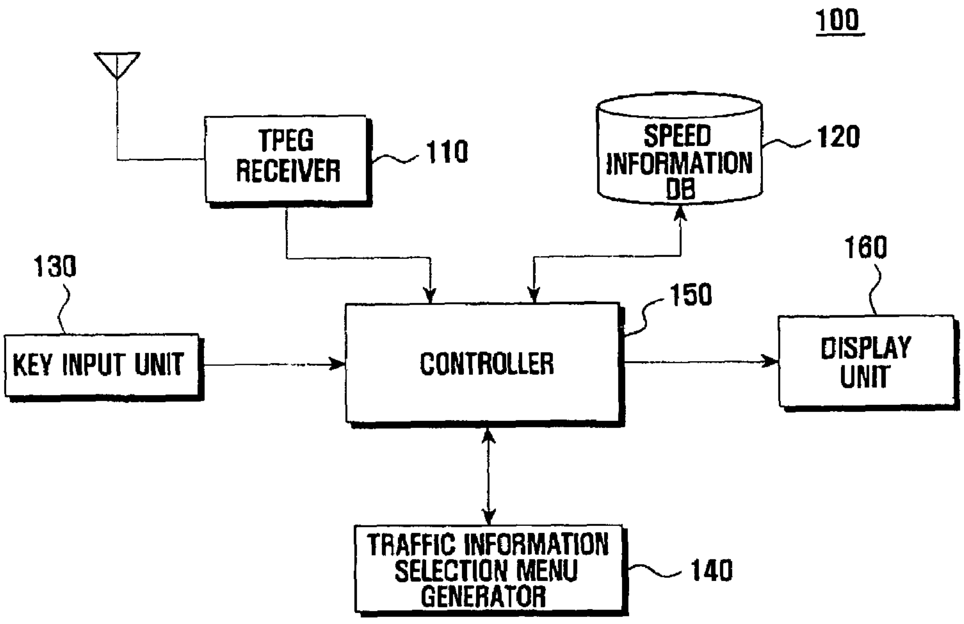
FIG. 2 is a block diagram illustrating the configuration of a mobile communication terminal according to the present invention.

FIG. 2 is a schematic block diagram illustrating the configuration of a mobile communication terminal according to the present invention. Referring to FIG. 2, the mobile communication terminal 100 comprises a TPEG receiver 110, a speed information database (DB) 120, a key input unit 130, a traffic information selection menu generator 140, a controller 150 and a display unit 160.

The TPEG receiver 110 receives TPEG data including real-time traffic information. The TPEG receiver 110 preferably receives DMB data from a data network such as a DMB network and detects TPEG data in the received DMB data.

The speed information DB 120 stores travel speed data on unit road-sections. In this invention, a unit road-section is the minimum unit of traffic information display. The speed information DB 120 preferably stores unit road-section travel speed data that is extracted from TPEG data received by the TPEG receiver 110 and transmitted by the controller 150. The controller 150 preferably detects real-time traffic information in the TPEG data received by the TPEG receiver 110, extracts unit road-section travel speed data from the detected real-time traffic information, and controls the speed information DB 120 to store the extracted unit road-section travel speed data. The speed information DB 120 categorizes a road-section into several groups in multiple levels based on a unit road-section and stores information on the groups together with group identification information. For example, one or more unit road-sections are categorized as a small group, one or more small groups are categorized as a medium group and one or more medium groups are categorized as a large group. The speed information DB 120 preferably stores identification information on the small group, medium group and large group, to which an individual unit road-section belongs, together with travel speed data on the unit road-section. A record structure of the speed information DB 120 is shown in FIG. 3, and is described later in relation to FIG. 3.

The key input unit 130 provides a user interface for inputting commands to control the operation of the mobile communication terminal 100. The key input unit 130 preferably inputs a user command for determining traffic information, and transmits the inputted user command to the controller 150. For example, the key input unit 130 preferably receives input of a user's operation signal for sequentially selecting groups from a high level group to a low level group (for example, selection of a large groups→selection of a medium group→selection of a small group→selection of a unit road-section) to determine traffic information on a desired area or road, and transmits the inputted operation signal to the controller 150. The traffic information selection menu generator 140 creates traffic information selection menus in response to user input commands requesting traffic information. The traffic information selection menu generator 140 preferably creates a traffic information selection menu regarding a low-level traffic information subordinate to selected current-level traffic information being displayed. The traffic information selection menu generator 140 creates a traffic information selection menu including travel speed data of an associated traffic level. For example, when a large group includes road classification information (for example, national road and expressway) and wide region information (for example, Z city and a Y State); a medium group, which is lower in level than the large group, includes types of roads (for example, national road name and expressway name); and a small group, which is lower in level than the medium group, includes a high-level road-section including a plurality of unit road-sections along an individual road. If a user selects the name of a specific expressway in the state that names of expressways corresponding to the medium group are being displayed, the traffic information selection menu generator 140 creates a traffic information selection menu for selecting a small group (for example, high-level road-sections described above, which are lower in level than an expressway) on the expressway, and creates a traffic information selection menu containing individual travel speed data (for example, average travel speed or lowest travel speed) of small groups (for example, high-level road-sections described above). For this purpose, the traffic information selection menu generator 140 preferably retrieves, from the speed information DB 120, travel speed data of unit road-sections included in a small group to calculate travel speed data of the associated small group.

The controller 150 controls the operation of the mobile communication terminal 100 on the basis of user commands inputted through the key input unit 130 and pre-stored executable programs. In particular, when the mobile communication terminal 100 operates in a DMB reception mode, the controller 150 controls reception of TPEG data through the TPEG receiver 110.

The controller 150 also controls the operation of the traffic information selection menu generator 140 in response to user commands requesting traffic information. For example, when a traffic information request is input through the key input unit 130, the controller 150 controls the traffic information selection menu generator 140 to create a menu for selecting traffic information, and controls display of the created menu on the display unit 160. The controller 150 preferably stores menu structure information for providing traffic information. For example, the controller 150 pre-stores level classification information for providing traffic information, and controls generation of traffic information selection menus using the pre-stored level classification information in response to user input commands requesting traffic information.

The level classification information is a menu structure classified as a large group, a medium group or a small group. That is, the medium group is lower in level than the large group and is higher in level than the small group.

The display unit 160 displays a visual signal under the control of the controller 150. The display unit 160 preferably displays a traffic information selection menu having travel speed data, created by the traffic information selection menu generator 140.

FIG. 3 shows a record structure of the speed information DB 120 maintaining road-section travel speed data in the mobile communication terminal 100. Referring to FIG. 3, in data records in the speed information DB 120, unit road-sections are grouped in multiple levels and identification information of the multi-level groups is stored. The speed information DB 120 has an identification information field 121, a large group name field 122, a medium group name field 123, a small group name field 124, a unit road-section name field 125, a first direction travel speed field 126, a second direction travel speed field 127, and a section length field 128.

The identification information field 121 may be used to store identification information to identify a corresponding unit road-section. For example, travel speed of "Thruway", which is one of the unit road-sections of QRS Expressway, is stored in a corresponding record, and information for identifying "Thruway" (for example a code) is stored in the identification information field 121.

The large group name field 122 may be used to store the name of a large group including a corresponding unit road-section. Road classification information is stored in the large group name field 122. For example, to store travel speed data of a unit road-section "Thruway" on QRS Expressway in a particular data record, "Expressway" is stored in the large group name field 122.

The medium group name field 123 may be used to store the names of roads classified as the medium group roads that are lower in level than the large group roads. The names of roads classified as the large group are stored in the medium group name field 123. For example, to store travel speed data of the unit road-section "Thruway" on QRS Expressway in a particular data record, "QRS Expressway" is stored in the medium group name field 123.

The small group name field 124 may be used to store the names of roads classified as the small group roads that are lower in level than the medium group roads. The names of high-level road-sections, including several unit road-sections constituting a road classified as the medium group, are stored in the small group name field 124. For example, the name of a high-level road-section including the unit road-section "Thruway" is stored in the small group name field 124.

The unit road-section name field 125 may be used to store the names of unit road-sections for which traffic speed is stored in a corresponding record data. For example, "Thruway" is stored in the case of the above example.

The first direction travel speed field 126, the second direction travel speed field 127 and section length field 128 may be used to store travel speed in a first direction (e.g., north), travel speed in a second direction (e.g., south) and length, respectively, at a unit road-section stored in the unit road-section name field 125. For example, if "Thruway" is stored in the unit road-section name field 125, northerly direction travel speed of the unit road-section "Thruway" is stored in the first direction travel speed field 126, southerly direction travel speed of the unit road-section "Thruway" is stored in the second direction speed field 127, and the length of the unit road-section "Thruway" is stored in the section length field 128.

As described above, the speed information DB 120 preferably stores and manages both travel speed data and associated classification information of unit road-sections.

Figure 4A:
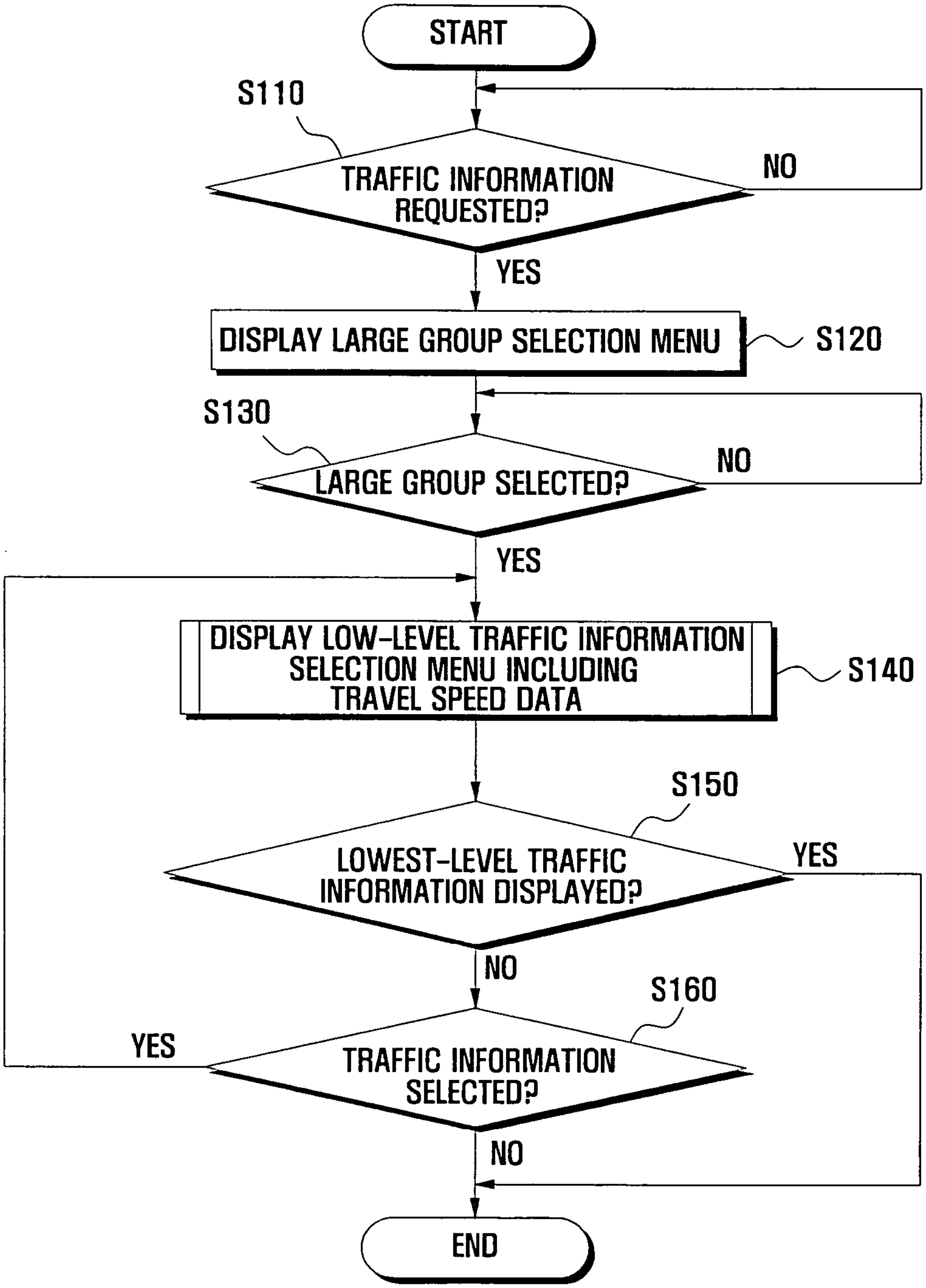
FIGS. 4A and 4B are flowcharts illustrating a traffic information display method using the mobile communication terminal of FIG. 2, according to the present invention.
Figure 4B:
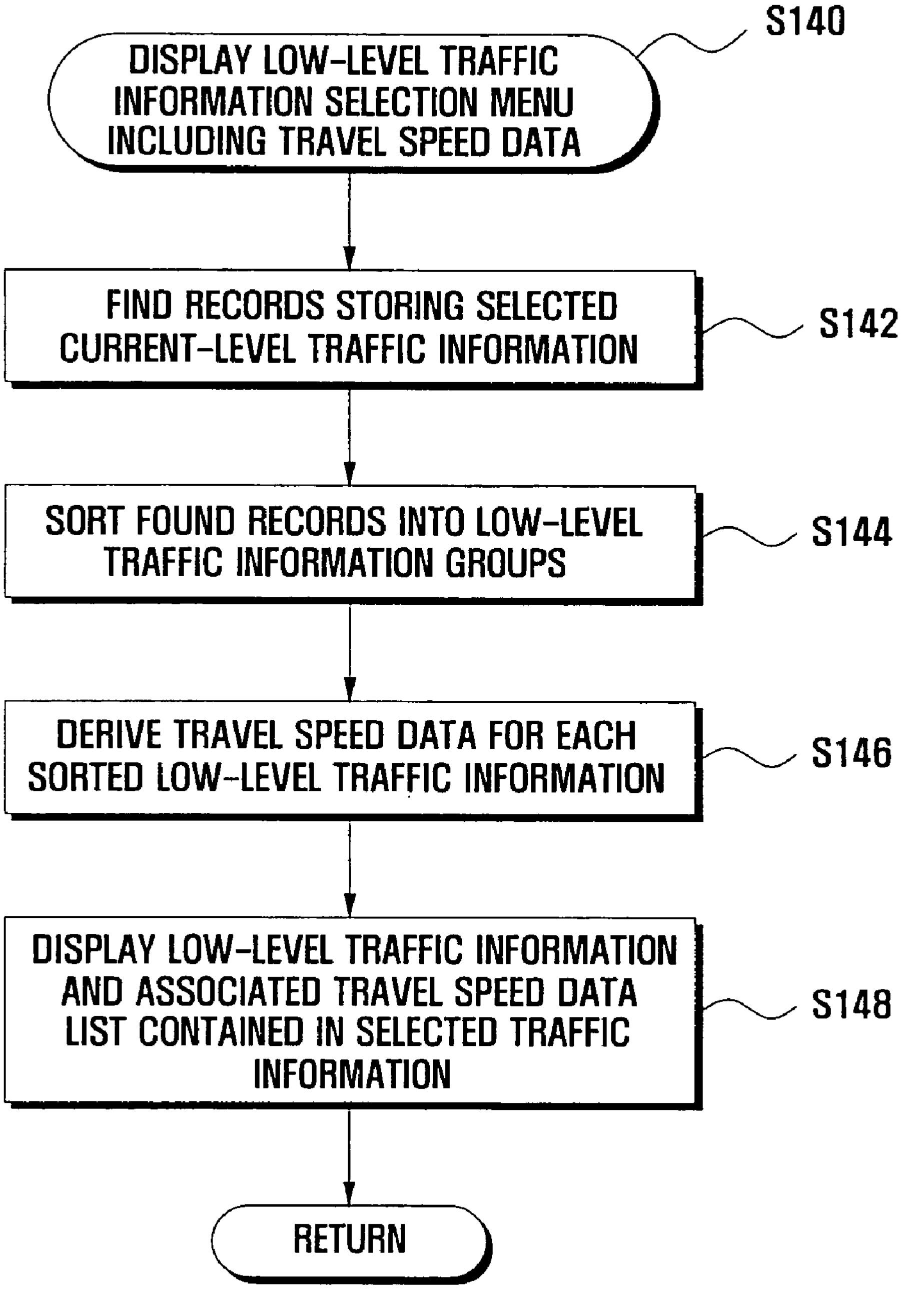

The flowcharts in FIGS. 4A and 4B illustrate a procedure to display traffic information including associated travel speed data at a user selectable level using the mobile communication terminal 100 described in relation to FIGS. 2 and 3.

Referring to FIGS. 2, 3 and 4A, when the user inputs a command requesting traffic information through the key input unit 130 (S110), the controller 150 controls the traffic information selection menu generator 140 to display a large group (for example, traffic information included in the highest level) selection menu on the display unit 160 (S120). The controller 150 preferably pre-stores menu structure information for providing traffic information. For example, the controller 150 pre-stores level classification information for providing traffic information, and creates traffic information selection menus in response to user commands according to the level classification information. The level classification information is a menu structure classified as a large group, medium group or small group. That is, the medium group is lower in level than the large group and is higher in level than the small group.

In step S120, the large group selection menu preferably includes information on a wide region (for example Z City, QRS Expressway, Y State) or a road classification.

If the user selects one of the large groups listed in the large group selection menu displayed at step S120 (S130), the controller 150 transmits the selected large group information to the traffic information selection menu generator 140. The controller 150 preferably transmits the selected large group information to the traffic information selection menu generator 140.

The traffic information selection menu generator 140 generates a low-level traffic information selection menu having travel speed data using the selected large group information, and displays the generated low-level selection menu on the display unit 160 (S140). The traffic information selection menu generator 140 computes travel speed data for traffic information in the medium group, and displays both the traffic information and computed travel speed data. If computing of travel speed data for traffic information in the low level is not possible, the computing procedure of the travel speed data is omitted. A detailed procedure for generation of a low-level traffic information selection menu at step S140 is illustrated in FIG. 4B, and is described later in relation to FIG. 4B.

Whether the traffic information displayed at step S140, that is the lowest-level traffic information is identified (step 150), and if the displayed traffic information is the lowest-level traffic information, the processing procedure of the traffic information is ended. If the traffic information displayed at step 150 is not the lowest-level traffic information, steps from S140 are repeated in response to traffic information selection (S160) for the displayed traffic information.

FIG. 4B illustrates a detailed procedure to display a low-level traffic information selection menu corresponding to step S140 in FIG. 4A. Referring to FIGS. 2, 3, 4A and 4B, the controller 150 finds, from the speed information DB 120, records storing large group information selected at the previous step S130 or current-level traffic information selected at step S160 (S142). For example, the controller 150 may find records having a large group name field value that is equal to that of the large group selected at step 130, from the speed information DB 120.

Next, the controller (150) sorts the records into low-level traffic information groups (S144). That is, the controller (150) may sort the records by a field value storing traffic information that is lower in level than current-level traffic information. For example, if the current level is "a large group", the records are sorted by a "medium group name field" value storing traffic information corresponding to the medium group that is lower in level than the large group. That is, records having the same medium group name field are sorted as the same group.

Travel speed data of low-level traffic information group sorted in step S144 is calculated in step S146. That is, the controller (150) calculates travel speed data of low-level traffic information group using travel speed data on a unit road-section corresponding to records included in the low-level traffic information group. The low-level traffic information and associated travel speed data list are displayed (S148).

For example, when "expressway" is selected as a large group at step S130 in FIG. 4A, records having "expressway" as a value stored in a large group name field 122 are searched from the speed information DB 120 at step S142. At step S144, the searched records are then sorted into groups of records having the same value stored in the medium group name fields 123. For example, data having values stored in the medium group name field 123 as 'QRS Expressway', 'TUV Expressway' and 'MNO Expressway' is sorted. That is, records having the same value stored in the medium group name field 123 are sorted as the same low-level traffic information.

At step S146, for each sorted low-level traffic information, associated travel speed data is calculated. For example, northerly/southerly direction travel speed data is associated with the "QRS Expressway" is calculated using values stored in the first and second travel speed fields 126 and 127 of records having "QRS Expressway" as a value stored in the medium group name field 123.

Figure 5:
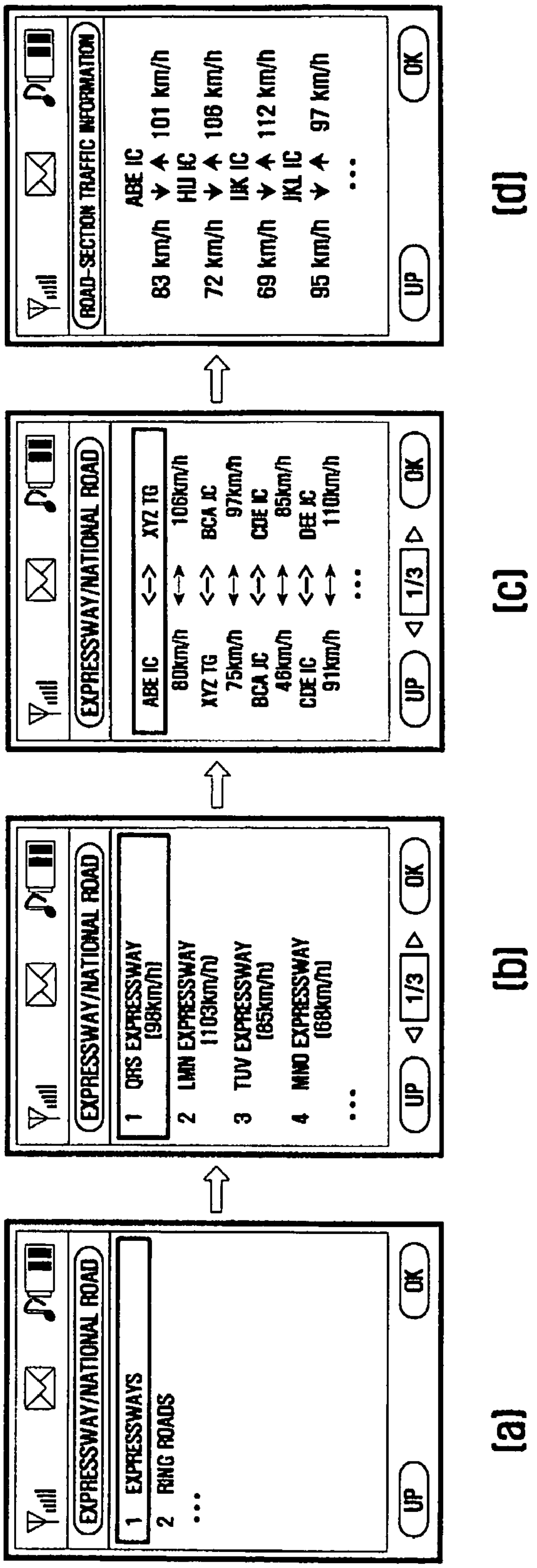
FIG. 5 is a series of display screen representations illustrating a traffic information display procedure of the method of FIGS. 4A and 4B.

FIG. 5 shows screen representations of the mobile communication terminal, wherein traffic information selection menus and traffic information are displayed according to a user's traffic information selection levels. FIG. 5A shows large group selection menus for selecting a large group. FIG. 5B shows selectable low-level traffic information menus in response to a selection of "expressway" as a large group in FIG. 5A. FIG. 5C shows selectable low-level traffic information menus in response to a selection of "QRS Expressway" in FIG. 5B. FIG. 5D shows traffic information on unit road-sections contained in the high-level road-section in the case that a high-level road-section representing 'Thruway' is selected in FIG. 5C. Referring to FIGS. 5B and 5C, associated travel speed data is displayed in road name selection menus and high-level road-section selection menus.

As apparent from the above description, the present invention provides a traffic information display method and apparatus wherein associated travel speed data on road-sections are displayed for high-level road-sections of unit road-sections that are minimum units for displaying traffic information. As a result, the user can determine traffic information in a more convenient manner.

This disclosure is not intended to limit the scope of the invention, but to serve only for illustrative purposes. It should be understood by the ordinary person skilled in the art that various changes or modifications of the embodiments are possible without departing from the spirit of the invention. For example, although, in the preferred embodiment, the large group is expressways, the large group is not limited thereto and it may also be national roads or wide regions for displaying traffic situations.

What is claimed is:

1. A traffic information display method comprising the steps of:

a) receiving Transport Protocol Experts Group (TPEG) data including real-time traffic information;

b) storing travel speed data of unit road-sections from the received TPEG data, the unit road-sections being minimum units of the traffic information display;

c) displaying, in response to a traffic information display request from a user, an initial selection menu of relatively higher-level traffic information among traffic information categorized in multiple levels on a display;

d) receiving one selection from the relatively higher-level traffic information by a user; and e) creating, in response to a selection from the relatively higher-level traffic information, a next selection menu of relatively lower-level traffic information including associated travel speed data, wherein the associated travel speed data is derived from the stored travel speed data of unit road-sections.

2. The traffic information display method of claim 1, wherein step c) comprises:

c1) finding records corresponding to the selected, relatively higher-level traffic information;

c2) sorting the records by field values of the relatively lower-level traffic information;

c3) deriving travel speed data from the relatively lower-level traffic information using data on unit road-sections corresponding to the sorted records; and c4) displaying the relatively lower-level traffic information and the derived travel speed data.

3. The traffic information display method of claim 2, wherein the travel speed data for the lower-level traffic information is an average value of the travel speed data of the unit road-sections included in the corresponding lower-level traffic information.

4. The traffic information display method of claim 2, wherein the travel speed data for the lower-level traffic information is a lowest value of travel speed data of the unit road-sections included in the corresponding lower-level traffic information.

5. The traffic information display method of claim 1, further comprising display of an average value of travel speed data of unit road-sections included in the corresponding lower-level traffic information.

6. The traffic information display method of claim 1, further comprising display of a lowest value of travel speed data of unit road-sections included in the corresponding lower-level traffic information.

7. The traffic information display method of claim 1, wherein the associated travel speed data is calculated from the stored travel speed data.

8. The traffic information display method of claim 1, wherein the associated travel speed data is an average value of the travel speed data of unit road-sections or the lowest value of travel speed data of unit road-sections.

9. A traffic information display apparatus comprising:

a receiver for receiving Transport Protocol Experts Group (TPEG) data including real-time traffic information;

a speed information database for storing travel speed data of unit road-sections from the received TPEG data and managing the travel speed data of unit road-sections that are minimum units for traffic information display;

a traffic information selection menu generator for creating an initial selection menu of relatively higher-level traffic information, creating a next selection menu of relatively lower-level traffic information including associated travel speed data, wherein the associated travel speed data is derived from the travel speed data of the unit road sections;

a controller for controlling the traffic information selection menu generator to respectively create the relatively higher-level traffic information and the relatively lower-level traffic information; and a display for displaying successively, upon selection by the user, the created higher-level traffic selection menu and then the created next selection menu together with the associated travel speed data.

10. The traffic information display apparatus of claim 9, wherein the receiver receives digital multimedia broadcasting (DMB) data including the TPEG data from a DMB network, and detects the TPEG data in the received DMB data.

11. The traffic information display apparatus of claim 9, wherein the speed information database includes:

a large group name field storing information on a large group including a highest-level traffic information among traffic information categorized in multiple levels;

a medium group name field storing one of a plurality of medium group names included in the large group stored in the large group name field;

a small group name field storing one of a plurality of small group names included in the medium group stored in the medium group name field;

a unit road-section name field storing one of a plurality of unit road-section names included in the small group stored in the small group name field;

a travel speed field storing real-time travel speed data of the unit road-section stored in the unit road-section name field; and a section length field storing a length of the unit road-section.

12. The traffic information display apparatus of claim 11, wherein the travel speed field is used to store travel speed data of two opposing traffic flows.

13. The traffic information display apparatus of claim 9, wherein the traffic information selection menu generator finds records storing the selected, relatively higher-level traffic information, sorts the records by field values of the relatively lower-level traffic information, derives the travel speed data from the relatively lower-level traffic information using data on unit road-sections corresponding to the sorted records, and displays the relatively lower-level traffic information and the derived travel speed data.

14. The traffic information display apparatus of claim 13, wherein the controller stores menu structure information for providing traffic information, and controls the traffic information selection menu generator using the stored menu structure information.

15. The traffic information display apparatus of claim 9, wherein the traffic information display apparatus is a mobile communication terminal.

* * * * *